United States Patent [19]
Tsubaki et al.

[11] Patent Number: 5,450,320
[45] Date of Patent: Sep. 12, 1995

[54] AUTOMATED GUIDED VEHICLE MOVABLE IN ALL DIRECTIONS

[75] Inventors: Tatsuo Tsubaki; Tatsuya Kumehashi, both of Ise, Japan

[73] Assignee: Shinko Electric Co., Ltd., Tokyo, Japan

[21] Appl. No.: 142,087

[22] Filed: Oct. 28, 1993

[30] Foreign Application Priority Data

Oct. 28, 1992 [JP] Japan ................... 4-290145

[51] Int. Cl.$^6$ .................... G06F 165/00; B60K 7/00
[52] U.S. Cl. ................. 364/424.02; 318/587; 901/1
[58] Field of Search ............. 364/424.01, 424.02; 180/167, 168, 169, 6.5; 318/587; 901/1

[56] References Cited

U.S. PATENT DOCUMENTS

| | | | |
|---|---|---|---|
| 3,370,668 | 2/1968 | Goodacre | 180/52 |
| 4,530,056 | 7/1985 | MacKinnon et al. | 364/424.02 |
| 4,547,636 | 10/1985 | Mizuno et al. | 200/61.54 |
| 4,800,977 | 1/1989 | Boegli et al. | 180/168 |
| 5,127,485 | 7/1992 | Wakuta et al. | 180/65.5 |
| 5,170,352 | 12/1992 | McTamaney et al. | 364/424.02 |
| 5,281,901 | 1/1994 | Yardley et al. | 318/587 |

FOREIGN PATENT DOCUMENTS

| | | |
|---|---|---|
| 0087138 | 8/1983 | European Pat. Off. |
| 490673 | 6/1992 | European Pat. Off. |
| 1522417 | 3/1968 | France . |
| 7701751 | 6/1978 | Germany . |
| WO87/01667 | 3/1987 | WIPO . |

*Primary Examiner*—Michael Zanelli
*Attorney, Agent, or Firm*—Bacon & Thomas

[57] ABSTRACT

An object of this invention is to provide an automated guided vehicle movable in all directions in which the cables will never be broken due to twisting, and it is unnecessary to perform a rest swing operation. The automated guided vehicle is movable in all directions and includes vehicle wheels and drive wheel mechanisms with drive mechanisms for driving the vehicle wheels, each of the drive wheel mechanisms being controlled by a steering mechanism so that the direction of movement of the automated guided vehicle is controlled with the vehicle body maintained unchanged in heading. Transmission of electric power between an electric power source unit on a vehicle body and the drive mechanism and/or steering mechanism, and transmission of signals between a control unit on the vehicle body and the drive mechanism and/or steering mechanism are carried out through a signal/power transmitting and receiving device which includes: a stationary electrode section provided on a member which is stationary with respect to the vehicle body and a rotary electrode section provided on a steering shaft of the steering mechanism in such a manner that the rotary electrode section is rotatable with respect to the stationary electrode section.

8 Claims, 10 Drawing Sheets

AUTOMATED GUIDED VEHICLE MOVABLE IN ALL DIRECTIONS

BACKGROUND OF THE INVENTION

1. Field of the invention

This invention relates to a carrying vehicle which is movable in all directions, comprising: vehicle wheels, and driving wheels with drive mechanisms for driving the vehicle wheels, in which each of the driving wheels are controlled with a steering mechanism so that its moving direction is controlled with the vehicle body maintained unchanged in heading.

2. Related Art

A carrying vehicle movable in all directions (such as an automated guided vehicle on which an article handling robot is mounted), as shown in FIG. 10, has a vehicle body 1; and three driving/steering units 3 arranged on the lower surface of the floor (bottom plate) 2 of the vehicle body 1. Each of the driving/steering units 3, as shown in FIG. 11, comprises: a steering mechanism 4 secured to the floor 2; and a drive wheel mechanism 6 coupled to the lower end of the steering shaft 5 of the steering mechanism 4. A driving wheel (or driving tire) 9 is fitted on the outer rotor 8 of a drive motor 7 of outer rotor type. On the vehicle body 1 are installed a battery, a power source unit such as a power converter for controlling the supply of power from the battery to the steering motor of the steering mechanism 4 and to the above-described drive motor, and a driving/steering control device for receiving feedback signals from the steering motor and the drive motor to control, for instance, the power converter.

FIG. 12 shows one example of a passageway along which the automated guided vehicle A moves. In FIG. 12, reference characters STA, STB and STC designate article handling stations in the yard.

When it is required for the automated guided vehicle A to approach any one of the article handling stations and stop there, its movement is limited by other devices (not shown) to some extent; that is, the automated guided vehicle A is forced to approach the station from a drive route while moving sideward which is spaced a certain distance from the line of the stations.

It is assumed that the automated guided vehicle A moves to the stations STA, STB and STC in the stated order; that is, it moves to positions 1, 2, 3, 4 and 5 in the stated order. During this movement, it is necessary to turn the driving wheels about their steering shafts 360° in one direction. If the driving wheel is turned 360° in one direction, then the power cables and the signal cables connected between the power source unit and the control device on the vehicle body and the steering mechanism and the driving wheel mechanism may be broken due to twisted.

In order to overcome this difficulty, the conventional automated guided vehicle is provided with a stopper or other suitable control means to prevent the angle of relative rotation of the vehicle from becoming more than 360°.

That is, when, in the case of FIG. 12, the vehicle is stopped at the position 2 or 4, a rest swing operation (in other words, a rest steering operation) is carried out; that is, only the steering shaft is turned 180°.

However, the rest swing operation raises the following problems: First of all, the rest swing operation takes a relatively long time. Furthermore, in the rest swing operation, the grounding surface of the driving tire is rubbed against the surface of the yard, so that the driving tire is worn; that is, it is lowered in durability. In addition, when the automated guided vehicle is used in the clean room, the particle produced by the rubbing of the tire cannot be disregarded.

SUMMARY OF THE INVENTION

Accordingly, an object of this invention is to eliminate the above-described difficulties accompanying a conventional automated guided vehicle movable in all directions. More specifically, an object of the invention is to provide an automated guided vehicle movable in all directions in which the cables will never be broken due to twisting, and it is unnecessary to perform the above-described rest swing operation.

The foregoing object of this invention has been achieved by the provision of an automated guided vehicle movable in all directions which comprises vehicle wheels, and drive wheel mechanisms with drive mechanisms for driving the vehicle wheels, in which each of the drive wheel mechanisms is controlled with a steering mechanism so that the direction of movement of the automated guided vehicle is controlled with the vehicle body maintained unchanged in heading;

transmission of electric power between an electric power source unit on a vehicle body and the drive mechanism and/or steering mechanism, and transmission of signals between a control unit on the vehicle body and the drive mechanism and/or steering mechanism are carried out through a signal/power transmitting and receiving means which comprises:

a stationary electrode member provided on a member which is stationary with respect to the vehicle body; and a rotary electrode member provided on a steering shaft of the steering mechanism in such a manner that the rotary electrode member is rotatable with respect to the stationary electrode member.

In the automated guided vehicle of the present invention, the steering mechanism is provided in parallel with the drive mechanism, and is adapted to drive, through a transmitting device, a steering shaft extended from the drive mechanism.

In the automated guided vehicle of the present invention, the steering mechanism is provided in series with the drive mechanism, directly driving the drive mechanism.

In the automated guided vehicle of the present invention, the signal/power transmitting and receiving means is a slip ring device, the stationary electrode member has slip rings which are provided on a hollow steering shaft of the steering shaft of the steering mechanism, and the rotary electrode member has brushes which are elastically in slide contact with the slip rings.

In the automated guided vehicle of the present invention, the signal/power transmitting and receiving means is of mercury switch type in which mercury is provided between stationary and rotary electrodes.

In the automated guided vehicle of the present invention, the signal/power transmitting and receiving means has a rotary transformer, and the transmission and reception of signals are controlled by the rotary transformer, and the transmission and reception of electric power are performed through brush or mercury means.

In the automated guided vehicle movable in all directions of the present invention, the steering mechanism has a steering motor of inner rotor type, the rotary shaft of which is a hollow steering shaft, a hollow slip ring shaft is coupled to one end of the steering shaft in such a manner that the hollow slip ring shaft is coaxial with the steering shaft, the slip ring shaft having holes in the wall thereof for receiving cables, and the slip rings are provided on the outer cylindrical surface of the slip ring shaft.

In the automated guided vehicle of the present invention, the steering shaft has a prolongation, which serves as the hollow slip ring shaft.

In the automated guided vehicle of the present invention, the steering mechanism has a steering motor of outer rotor type, the rotor of which serves as a steering shaft, a hollow slip ring shaft is arranged in the steering shaft in such a manner that the hollow slip ring shaft is coaxial with the steering shaft, the hollow slip ring shaft having holes in the wall thereof for receiving electric wires, and the slip rings are provided on the outer cylindrical surface of the slip ring shaft.

In the automated guided vehicle of the present invention, the steering mechanism has a steering motor of outer rotor type, the rotor of which serves as a steering shaft, and a slip ring shaft is extended from an end lid of the rotor into the rotor in such a manner that the slip ring shaft is coaxial with a hollow stationary shaft of the steering motor.

In the automated guided vehicle of the present invention, the steering mechanism has a steering motor of outer rotor type, the rotor of which serves as a steering shaft, and a slip ring shaft is arranged outside the rotor in such a manner that the slip ring shaft is coaxial with the rotor.

In the automated guided vehicle movable in all directions according to the invention, the cable connected to the drive wheel mechanism is extended through the inside of the steering shaft and connected to the rotary electrode member which is rotated together with the steering shaft, and the cable connected to the steering mechanism is also extended through the inside of the steering shaft and connected to the rotary electrode member. The rotary electrode member is rotatable with respect to the stationary electrode member which is provided on the member which is on the stationary side of the vehicle body. Hence, when the drive wheel rotates with respect to the vehicle body, those cables are also turned together with the drive wheel. That is, even when it turns more than 360°, the cables will never be twisted.

DETAILED DESCRIPTION OF THE PREFERRED EMBODIMENTS

An automated guided vehicle movable in all directions, which constitutes a first embodiment of this invention, will be described with reference mainly to FIG. 1.

Figure 1:
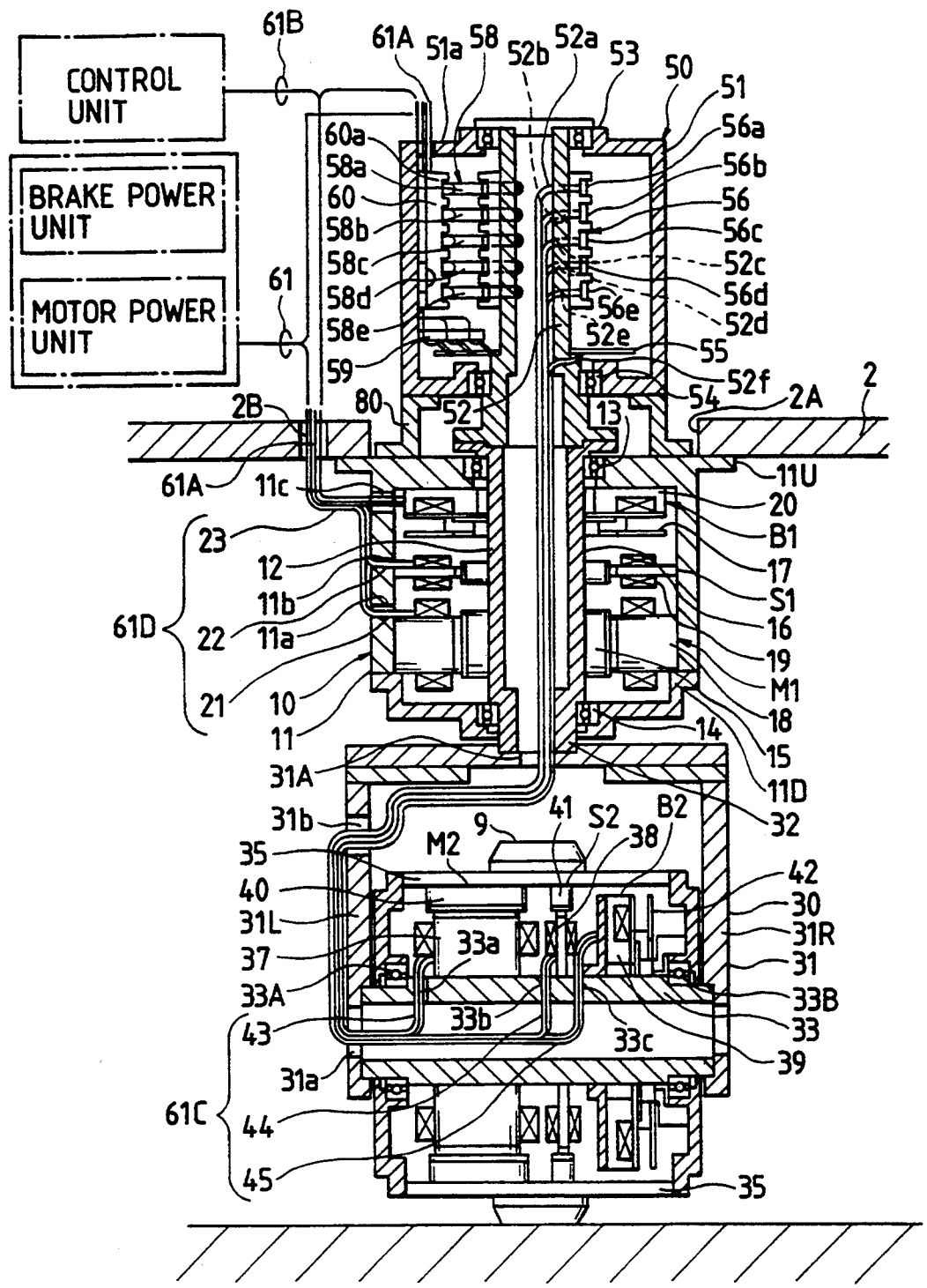
FIG. 1 is a vertical sectional view outlining the arrangement of a first embodiment of this invention.

In FIG. 1, reference numeral 10 designates a steering mechanism; 11, the casing of the steering mechanism 10; 30, a drive wheel mechanism; 31, a bracket of the drive wheel mechanism 30; 50, a slip ring device; and 51, the casing of the slip ring device 50.

The casing 11 of the steering mechanism 10 is in the form of a cylinder with the ends closed with upper and lower end lids 11U and 11D. The casing 11 is secured to the floor 2 of the vehicle body with the upper end cover 11U fastened to the lower surface of the floor 2 with bolts or the like. The casing 11 supports a hollow steering shaft 12 with the aid of bearings 13 and 14 in such a manner that the shaft 12 is held vertical.

The bracket 31 of the drive wheel mechanism 30 has right and left side walls 31R which are coupled through a bracket coupling plate to each other. The lower end portion of the steering shaft 12, which is extended downwardly through the lower end lid 11D, is fitted in a recess 32 which is formed in the bracket coupling board of the bracket 31 of the drive wheel mechanism 30. The lower end portion of the steering shaft 12, is coupled to the coupling board with bolts or the like; that is, the coupling board is supported by the lower end portion of the steering shaft 12 which is extended through the lower end lid 11D.

The upper end portion of the steering shaft 12, which is extended through the upper end lid 11U, is protruded into a hole 2A formed in the floor 2 of the vehicle body. The upper end portion thus protruded is joined to the lower end portion of the hollow slip ring shaft 52 of the slip ring device 50. A protective ring 80 is fitted in the hole 2A of the floor 2, and secured to the upper end lid 11U of the casing 11 of the steering mechanism 10, in such a manner that it surrounds the joint of the steering shaft 12 and the slip ring shaft 52. The casing 51 of the slip ring device 50 supports the slip ring shaft 52 through bearings 53 and 54 and is secured on the protective ring 80.

The rotor 15 of a steering motor M1, the magnetic pole rotor 16 of a rotation sensor S1 such as an encoder, and the movable friction board 17 of a steering electromagnetic brake B1 are mounted on the steering shaft 12 of the steering mechanism 10. The stator 18 of the steering motor M1, the pickup element (pickup coil) 19 of the rotation sensor 20, and the stationary friction board and exciting section 20 of the steering electromagnetic brake B1 are secured to the casing 11. Further in FIG. 1, reference numeral 21 designates a power cable connected to the steering motor M1; 22, a signal line connected to the rotation sensor S1; and 23, a power cable connected to the steering electromagnetic brake B1 (the cables and the line are assembled into one unit 61D). The power cable 21, the signal line 22, and the power cable 23 are extended outside through wire holes 11a, 11b and 11c formed in the side wall of the casing 11, respectively, and are then bundled outside the casing 11, and extended into the vehicle body through a wire hole 2B formed in the floor (bottom board) 2 of the automated guided vehicle. Under this condition, the power cable 21 of the steering motor M1, and the power cable 22 of the steering electromagnetic brake B1 are connected to a motor power source unit and a brake power source unit, respectively, and the signal line of the rotation sensor S1 is connected to a control unit.

The drive wheel mechanism 30 incorporates a drive motor M2. The drive motor M2 is of outer rotor type, and its motor shaft (being an axle) is supported by the brackets 31R and 31L at both ends. The outer rotor 35 is supported through bearings 33A and 33B on the motor shaft 33. A driving tire 9 is fixedly put on the outer rotor 35. The motor shaft 33 is in the form of a hollow tube. The stator 37 of the motor M2, the pickup element 38 of a rotation sensor S2 such as an encoder, and the stationary friction board and exciting section 39 of a drive wheel electromagnetic brake B2 are mounted on the hollow motor shaft 33. On the other hand, the rotor 40 of the motor M2, the rotor 41 of the rotation sensor S2, and the movable board 42 of the drive wheel electro-magnetic brake B2 are provided on the outer rotor 35. In FIG. 1, reference numeral 43 designates a power cable connected to the drive motor M2; 44, a signal line connected to the rotation sensor S2; and 45, a power cable connected to the drive wheel electro-magnetic brake B2 (the assembly of those lines 43, 44 and 45 being designated by 61C). The power cable 43, the signal line 44, and the power cable 45 are extended into the hollow motor shaft 33 respectively through wire holes 33a, 33b and 34c formed in the cylindrical wall of the motor shaft 33, and are then extended outside through the left end of the motor shaft 33 and a hole 31a formed in the left side wall 31L of the casing 31. Those lines 43, 44 and 45 thus extended are further extended through a hole 31b formed in the left side wall 31L and then through a hole 31A, which is communicated with the recess 32, into the steering shaft 12 and the slip ring shaft 52.

Figure 2:
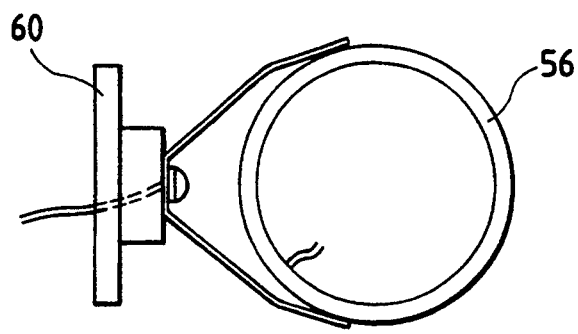
FIG. 2 is an explanatory diagram showing essential components of a slip ring device in the first embodiment of the invention.
Figure 3:
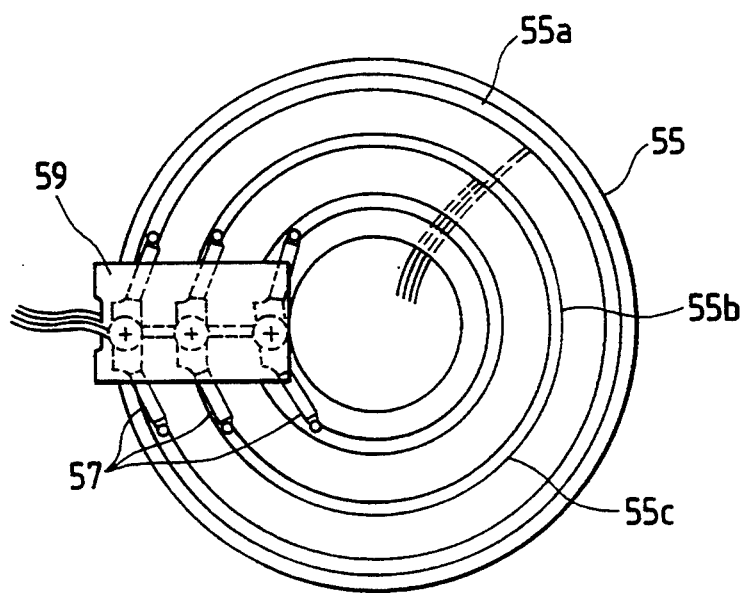
FIG. 3 is an explanatory diagram showing other essential components of the slip ring device in the first embodiment.

A disk-type slip ring 55 (FIG. 3) and ring-type slip rings 56 (or 56a through 56e) (FIG. 2), which form a rotary electrode section, are mounted on the slip ring shaft 52. Terminal sections 59 and 60 (which form a stationary electrode section) are provided on the inner surface of the housing 51. The terminal section 59 has electrically conducive brushes 57 (or 57a, 57b and 57c) which are elastically brought in slide contact with conductors 55a, 55b and 55c of the disk-type slip ring 55, respectively. The terminal section 60 has electrically conductive brushes 58 (or 58a through 58e), which are elastically brought into slide contact with the ring-type slip rings 56 (56a through 56e), respectively. The stationary electrode section, the brushes, and the rotary electrode section form signal/power transmitting and receiving means.

The power cable 43 of the drive motor M2, and the power cable 45 of the drive wheel electromagnetic brake B2 are extended outside the slip ring shaft 52 through wire holes 52a through 52e formed in the cylindrical wall of the slip ring shaft 52, and then connected to the respective ring-type slip rings 56a through 56e. The signal line 44 of the rotation sensor S2 is extended outside the slip ring shaft 52 through a wire hole 52f formed in the cylindrical wall of the slip ring shaft 52, and then connected to the disk-type slip ring 55. A power cable connected to the motor power source unit, and a power cable connected to the brake power source unit (those cables being designated by 61A) are extended into the casing 51 through a wire hole 51a formed in the casing 51, and then extended through a wire hole 60a formed in the terminal section 60 and connected to the respective terminal in the terminal section 60. A signal line 61B connected to the aforementioned control unit is extended into the casing 51 through the wire hole 51a, and connected to the respective terminal 59.

In the above-described first embodiment, the drive wheel mechanism 30, the steering shaft 12, and the rotary electrode section turns as one unit, and the cable 61C of the drive wheel mechanism 30 is extended through the inside of the steering shaft 12 and connected to the rotary electrode section. Hence, those cables will never be twisted.

Figure 4:
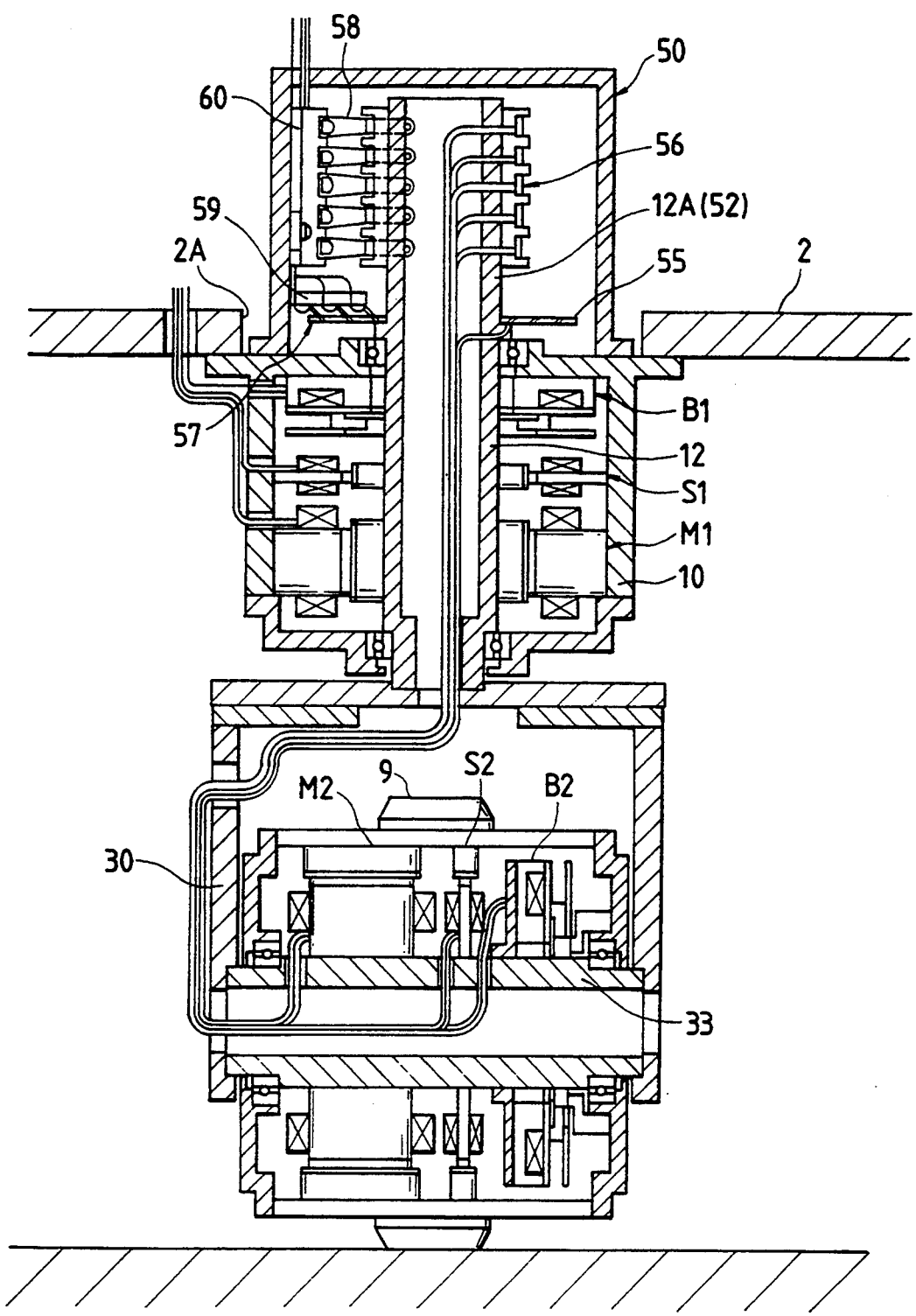
FIG. 4 is a vertical sectional view outlining the arrangement of a second embodiment of the invention.

FIG. 4 shows a second embodiment of the invention. The second embodiment is different from the first embodiment only in the following points: The steering shaft 12 and the slip ring shaft 52 of the first embodiment are formed into one unit. That is, the steering shaft 12 has a prolongation 12A, which is protruded into the casing 51, so that the prolongation 12A is employed as the slip ring 52. The second embodiment dispenses with the bearings 53 and 54 of the protective ring 80 of the first embodiment shown in FIG. 1.

Figure 5:
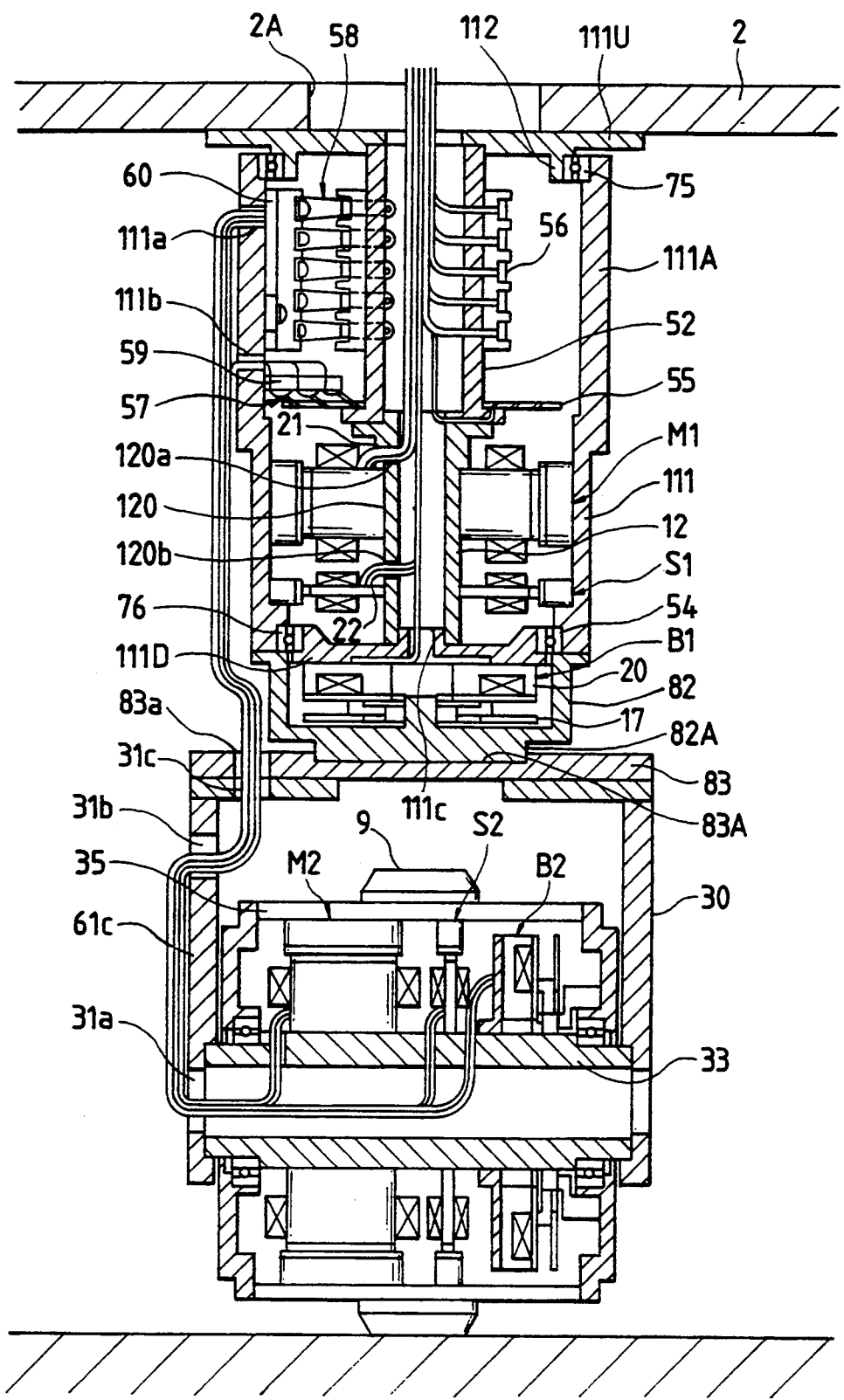
FIG. 5 is a vertical sectional view outlining the arrangement of a third embodiment of the invention.

FIG. 5 shows a third embodiment of the invention. In the third embodiment, the steering motor M1 is of outer rotor type, and its rotor 111 is employed as the steering shaft. That is, the rotor 111 has a prolongation 111A which serves as the above-described casing 51. The upper open end of the rotor 111 is put on the outer cylindrical surface of an annular protrusion 112 through a bearing 75 which is extended from a mounting member 111U (which is one of the end lids of the motor M1) which is secured to the lower surface of the floor 2; whereas the lower open end of the rotor 111 is put on the outer cylindrical surface of another mounting member 111D (which is the other end lid of the motor M1) through a bearing 76. The shaft (or hollow stationary shaft) 120 of the steering motor M1 is integral with the slip ring shaft 52. That is, those shafts 120 and 52 provided as one unit are supported by the end lids 111U and 111D. A steering electro-magnetic brake B1 is set inside a bracket 82 which is secured to the lower end of the rotor 111. A bracket 31 is coupled through the bracket 82 and a coupling board 83 to the rotor 111. The bracket 82 has a protrusion 82A extended downwardly, which is engaged with a recess 83A formed in the coupling board 83. The coupling board 83 has a wire hole 83a. The stationary friction board and exciting section 20 of the steering electromagnetic brake B1 is provided on the end lid 111D, and the movable friction board 17 is secured to the bracket 82.

In the third embodiment, the power cable 43 of a drive motor M2, the signal line of a rotation sensor S2, and the power cable 45 of a drive wheel electromagnetic brake B2 (the assembly of those lines 43, 44 and 45 being designated by 61C) are extended through a wire hole 43 formed in the side wall of the bracket 31 and through a wire hole 83a formed in the coupling board 83. Furthermore, the power cable 43 of the drive motor M2, and the power cable 45 of the drive wheel electromagnetic brake B2 are extended through a wire hole 111a formed in the cylindrical wall of the rotor 111 into the rotor 111, and connected to the respective terminals in the terminal section 60; while the signal line 44 of the rotation sensor S2 is extended through a wire hole 111b formed in the cylindrical wall of the rotor 111, and connected to the respective terminal in the terminal section 59. On the other hand, the power cables from the power source units, and the signal line from the control unit are connected to the ring section and the disk section. The power cable 23 of the steering electromagnetic brake B1 is extended through a wire hole 120b in the shaft 120 and through the inside of the slip ring shaft 52. The signal line 22 of the rotation sensor S1 is extended through a wire passageway 111c formed in the end lid 111D, and through the inside-of the shaft 120 into the inside of the slip ring shaft 52.

Figure 6:
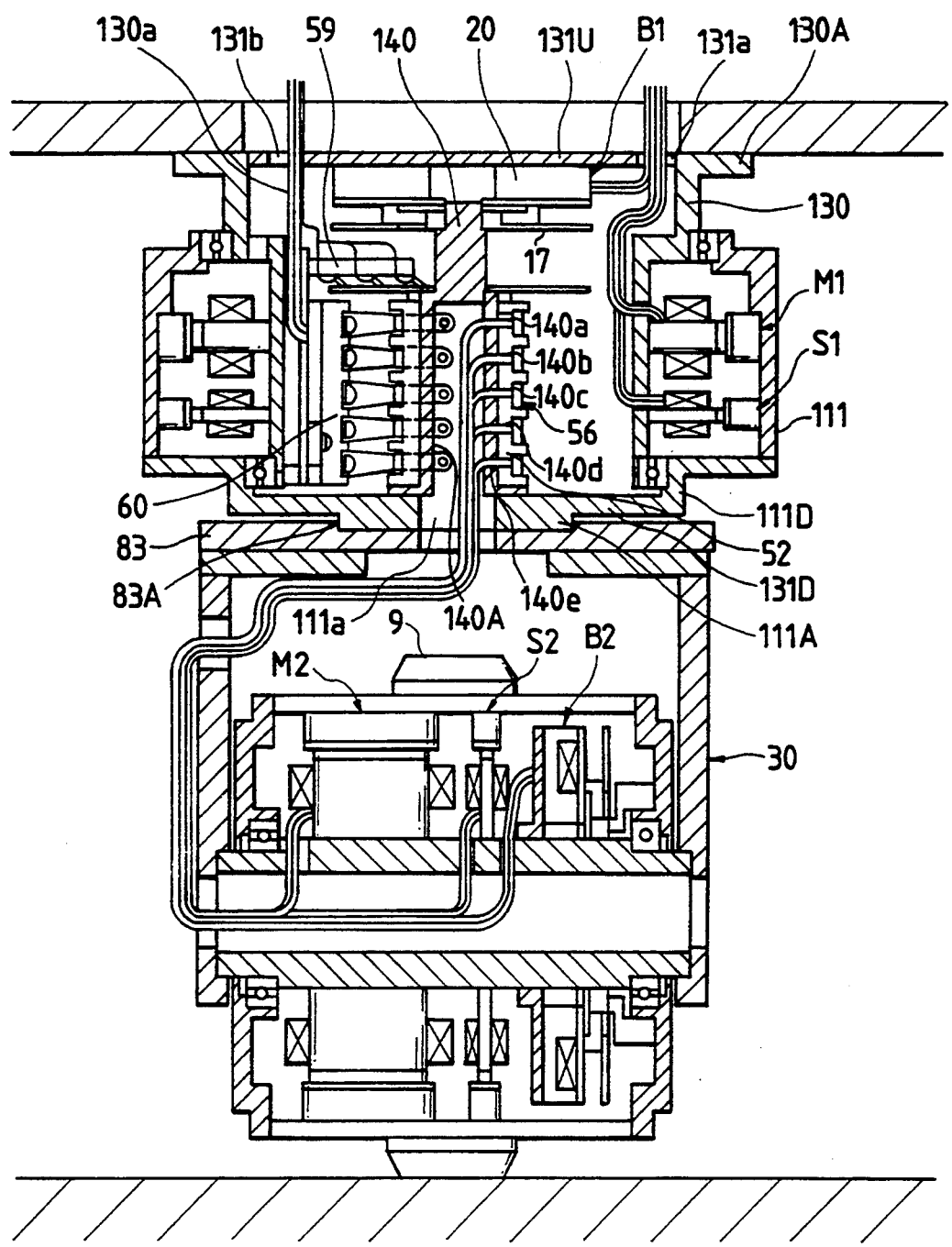
FIG. 6 is a vertical sectional view outlining the arrangement of a fourth embodiment of the invention.

FIG. 6 shows a fourth embodiment of the invention. In the fourth embodiment, similarly as in the case of the third embodiment shown in FIG. 5, its steering motor M1 is of outer rotor type. However, the fourth embodiment is different from the third embodiment in that a slip ring shaft 52 and terminal sections 59 and 60 are provided in the hollow shaft 130 of the steering motor M1 in such a manner that they are coaxial with the hollow shaft 130, and the slip ring shaft 52 is put on a shaft member 140 which is extended vertically from the lower end lid 11D of the rotor 111. The upper end of the hollow shaft 130 is closed with an end lid 131U, and has a flange 130A which is secured to the rear surface of the floor 2 with bolts or the like. The shaft member 140 has a hole 140A which is opened downwardly. The movable friction board 1 of a steering electromagnetic brake B1 is mounted on the upper end portion of the shaft member 140, and the stationary friction board and exciting section 20 of the brake B1 is fixedly secured to the aforementioned end lid 131U. In FIG. 6, reference characters 131a and 131b designate wire holes formed in the end lid 131U. The lower end lid 111D of the rotor 111 has a protrusion 111A which is fitted in a recess 83A formed in a coupling board 83, and a wire hole 111a.

Figure 7:
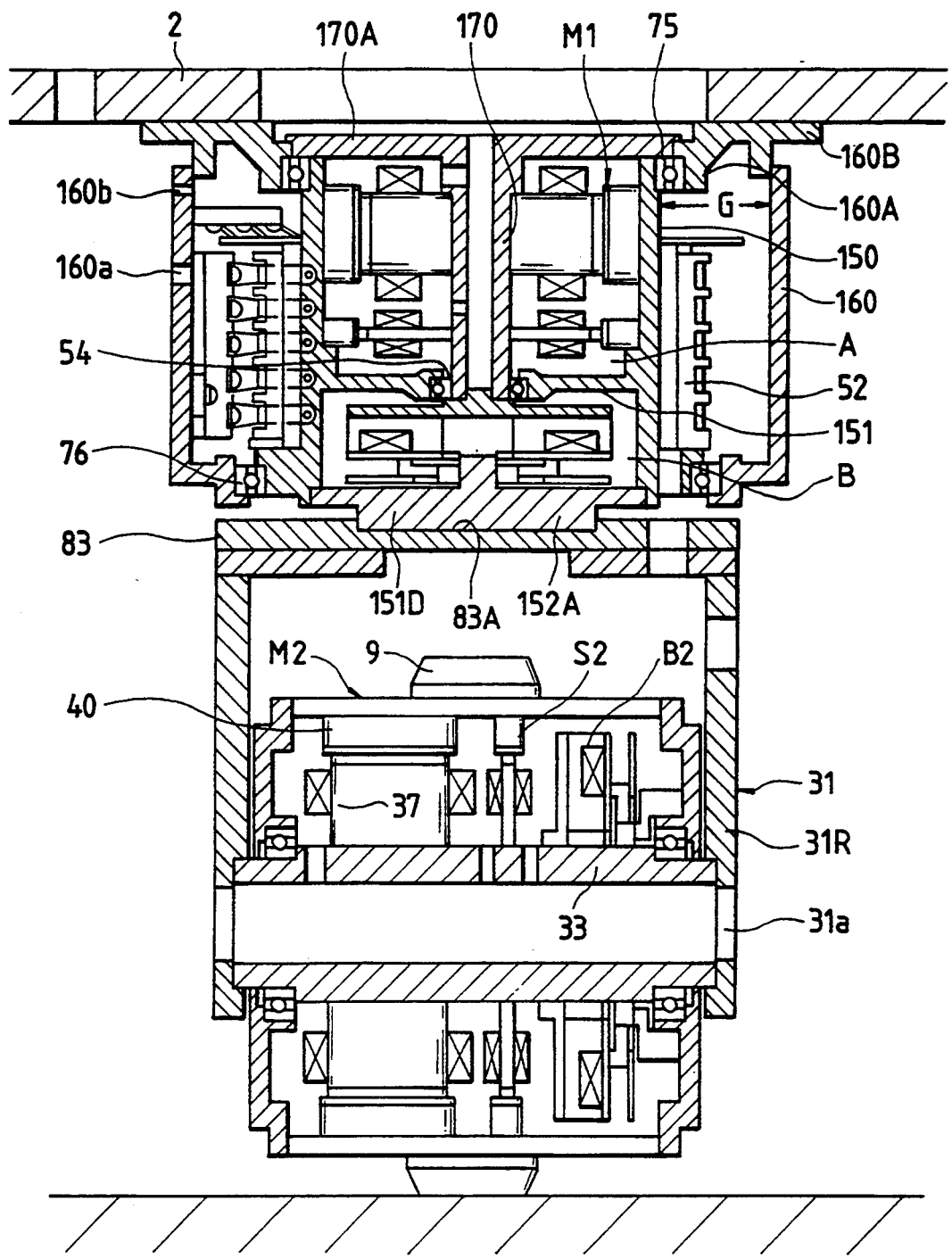
FIG. 7 is a vertical sectional view outlining the arrangement of a fifth embodiment of the invention.

FIG. 7 shows a fifth embodiment of the invention. In the sixth embodiment, similarly as in the case of the above-described third and fourth embodiments (FIGS. 5 and 6), its steering motor M1 is of outer rotor type. However, the fifth embodiment is substantially different from the third and fourth embodiments in that a hollow slip ring shaft 52 is provided outside the rotor 150 of the motor in such a manner that the shaft 52 is coaxial with the steering motor M1, and a stationary frame 160 surrounds the slip ring shaft 52 with a space G therebetween.

The stationary frame 160 has an internal annular member 160A with an upper flange 160B. The upper flange 160B is secured to the floor 2 with bolts or the like. Wire holes 160a and 160b are formed in the side wall of the stationary frame 160.

The inside of the rotor 150 is divided by a partition wall 151 into a motor chamber A and a brake chamber B. The upper end portion of the rotor 150 is fitted in the internal annular member 160A of the stationary frame 160 through a bearing 75, and the lower end portion is fitted in the lower end portion of the stationary frame 160 through a bearing 76. The lower end of the rotor 150 is closed with an end lid 151D. The end lid 151D has a protrusion 152D, which is engaged with a recess 83A formed in a coupling board 83. The shaft 170 of the steering motor M1 is hollow, and has a flange 170A at the upper end which closes the upper end of the rotor 150. The lower end portion of the shaft 170 is supported through a bearing 54 by the aforementioned partition wall 151.

Figure 8:
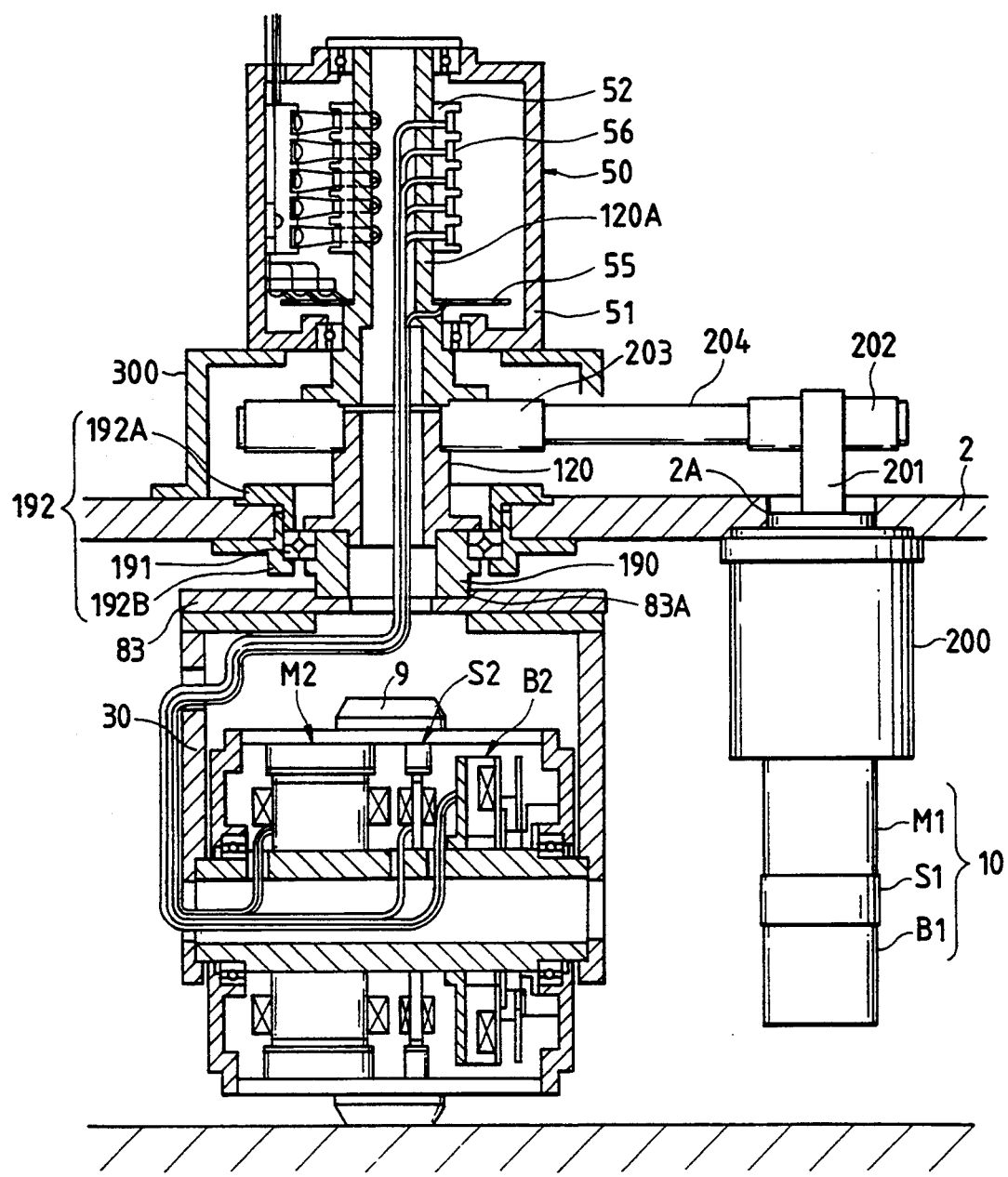
FIG. 8 is a vertical sectional view outlining the arrangement of a sixth embodiment of the invention.

FIG. 8 shows a sixth embodiment of the invention. In the sixth embodiment, a steering mechanism 10 is provided in parallel with a drive wheel mechanism 30, and secured through a speed reducing unit 200 to the lower surface of the floor 2. The speed reducing unit 200 has a drive shaft 201 protruded above the floor 2, on which a toothed pulley 202 is fixedly mounted.

The drive wheel mechanism 30 is mounted on the floor 2 through a mounting member 190, a bearing 191, and a mounting member 192. A steering shaft 120 having a prolongation 120A is mounted vertical on the mounting member 190. The mounting member 190 is in the form of a short tube. The lower end portion of the mounting member 190 is fitted in a recess 83A formed in a coupling board 83, and secured to the coupling board 83 with bolts or the like. The mounting member 192 comprises an upper member 192A which is in the form of a short tube with a flange; and a lower member 192B which is also in the form of a short tube. The mounting member 192 is engaged a hole 2A formed in the floor 2. The mounting member 190 is fitted in the mounting member 192 through the bearing 191. The prolongation 120A of the steering shaft 120 is extended into the casing 51 of a slip ring device; that is, it serves as a slip ring shaft. A toothed pulley 203 is fixedly mounted on the end portion of the slip ring shaft which end portion is located outside the casing 51. A toothed belt is laid over the toothed pulley 203 and the above-described toothed pulley 202. In FIG. 8, reference numeral 300 designates a slip ring supporting frame.

In the above-described embodiment, transmission and reception of electric power and signals for the vehicle body, the steering mechanism, and the drive mechanism are carried out through the slip ring device 50. However, they may be performed by using different means as shown in FIG. 9.

Figure 9:
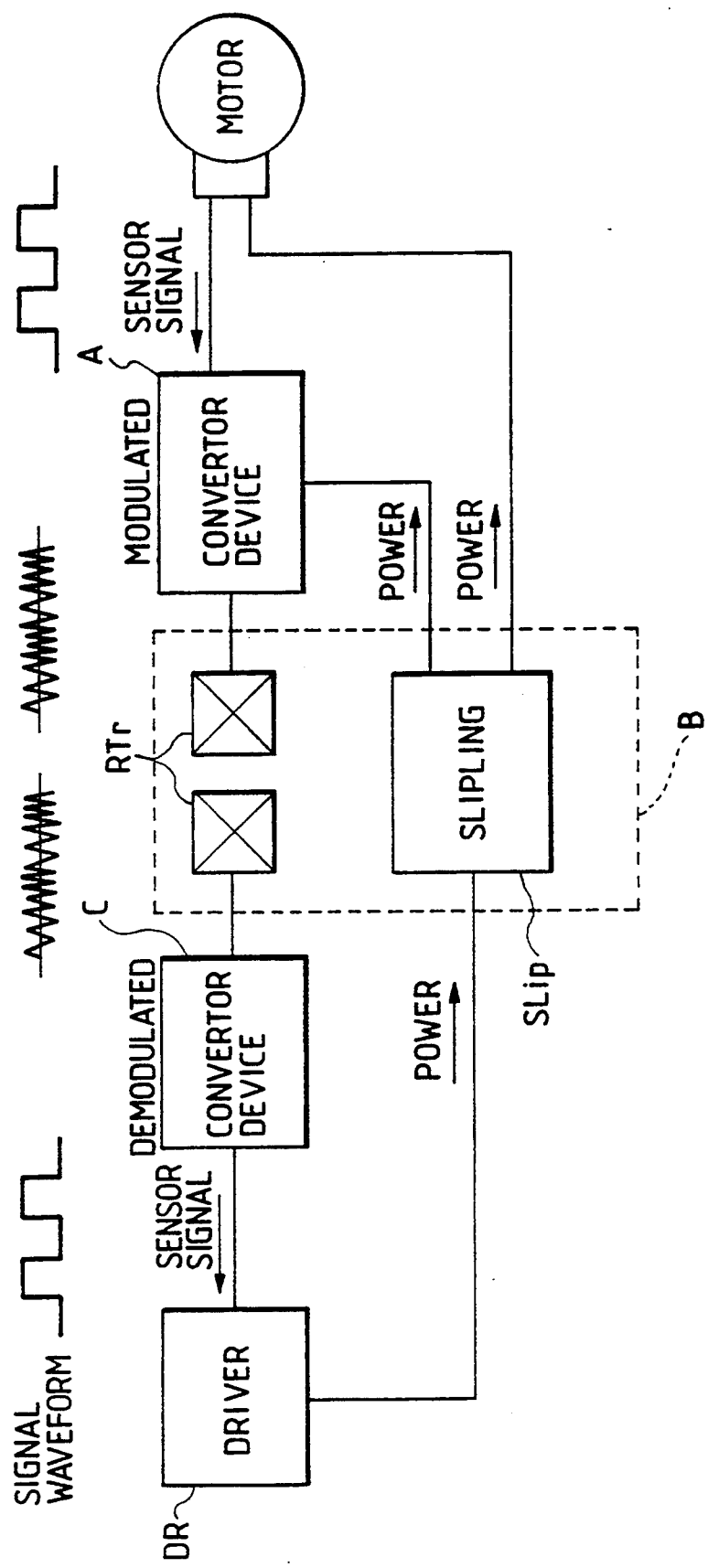
FIG. 9 is a vertical sectional view outlining the arrangement of a seventh embodiment of the invention.
Figure 10:
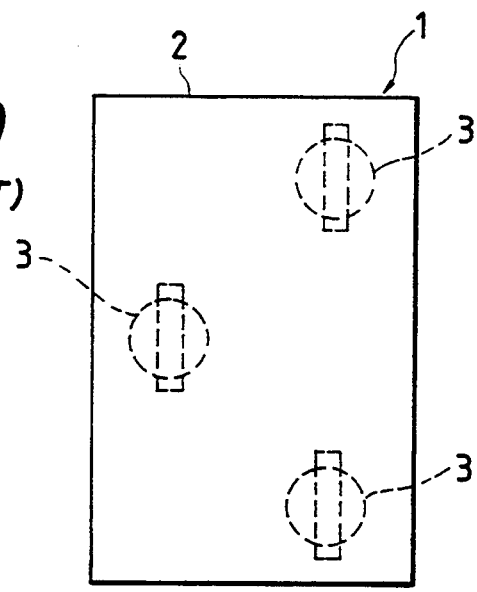
FIG. 10 is an explanatory diagram showing the arrangement of a driving/steering unit in an automated guided vehicle movable in all directions.
Figure 11:
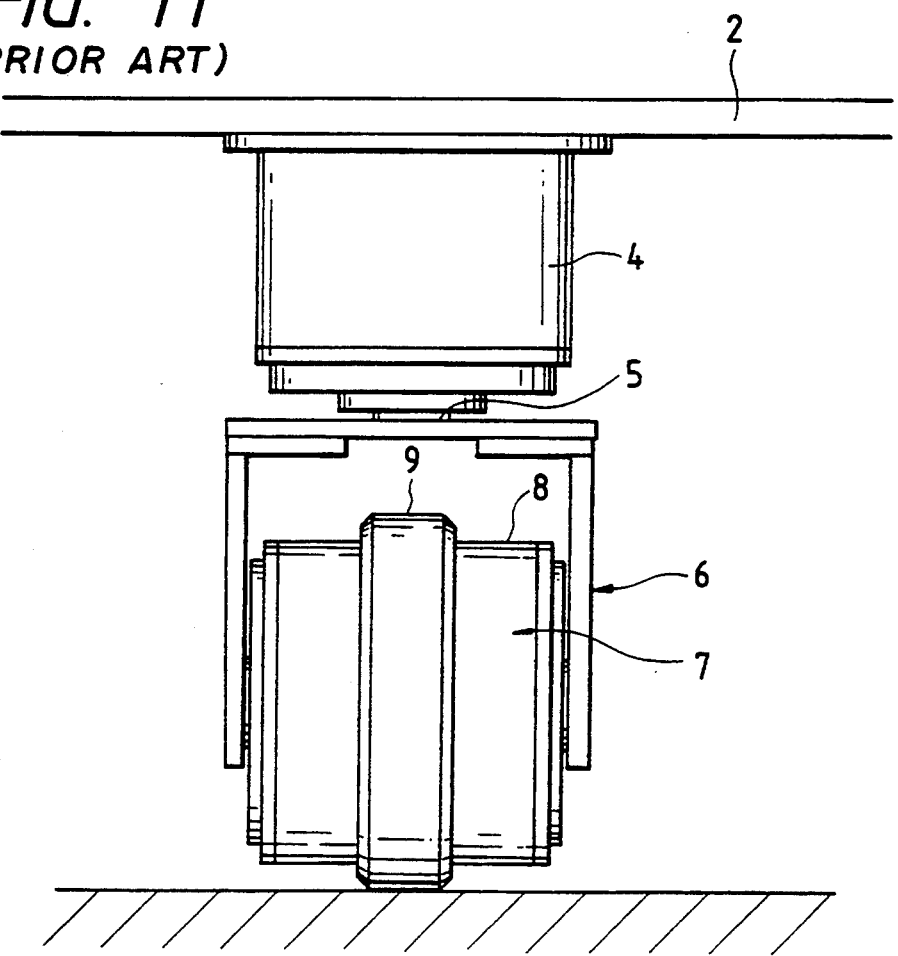
FIG. 11 is a side view of a driving/steering unit in FIG. 10.
Figure 12:
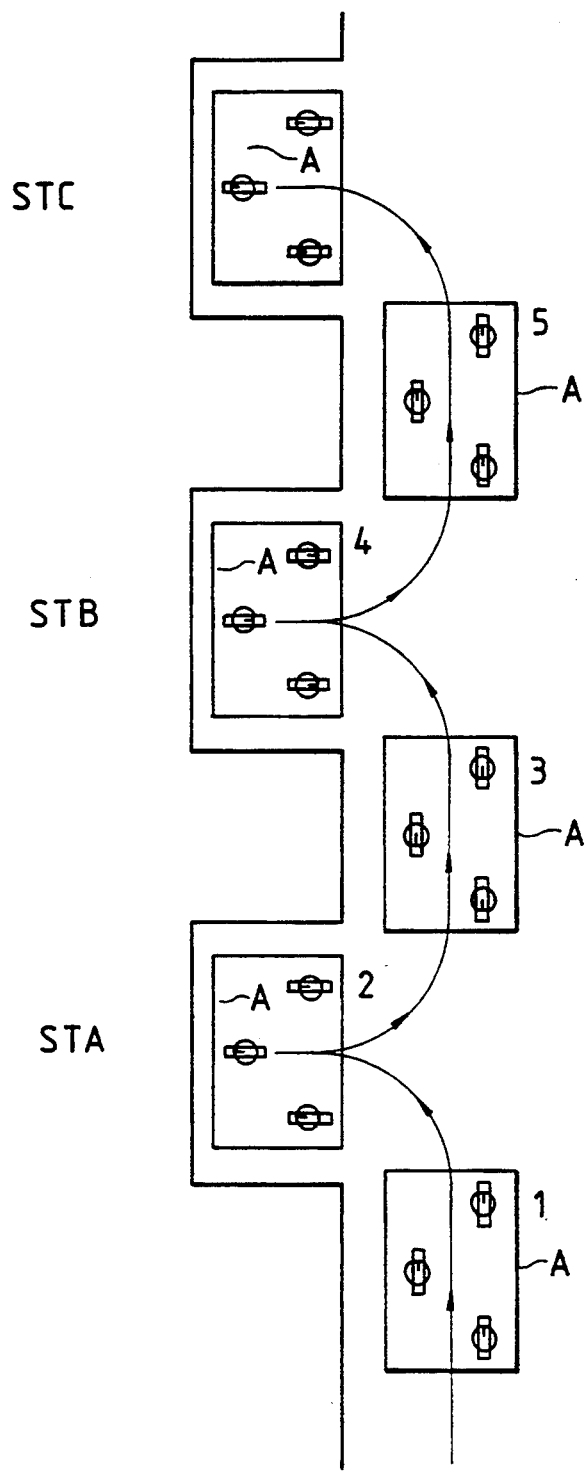
FIG. 12 is an explanatory diagram showing an example of a way along which a conventional automated guided vehicle movable in all direction moves, for a description of difficulties accompanying the conventional automated guided vehicle.

FIG. 9 shows a seventh embodiment of the invention. In FIG. 9, reference character DR designates a driver (or power source unit). The driver DR provides controlled driving electric power, which is applied through a slip ring device slip forming a signal/power transmitting and receiving device B (encircled by the broken line in FIG. 9) to the motors in the motor drive mechanism and the steering mechanism. The output of the sensor such as the above-described rotation sensor S1 is modulated by a converter device A, and applied through a rotary transformer RTr forming the signal/power transmitting and receiving device B to a converter device C, where it is demodulated. The output of the converter device C is applied to the driver DR.

In the seventh embodiment shown in FIG. 9, transmission and reception of the signals are carried out through the rotary transformer, and transmission and reception of the driving electric power are performed through the slip ring device; however, the invention is not limited thereto or thereby. That is, a-mercury switch may be employed for transmission and reception of the driving electric power.

In the automated guided vehicle movable in all directions according to the invention, the cable connected to the drive wheel mechanism is extended through the inside of the steering shaft and connected to the rotary electrode section which is rotated together with the steering shaft, and the cable connected to the steering mechanism is also extended through the inside of the steering shaft and connected to the rotary electrode section. The rotary electrode section is rotatable with respect to the stationary electrode section which is provided on the member which is on the stationary side of the vehicle body. Hence, when the drive wheel rotates with respect to the vehicle body, those cables are also turned together with the drive wheel. That is, even when it turns more than 360°, the cables will never be broken being twisted. Thus, in the case of the automated guided vehicle of the invention, unlike the conventional one, it is unnecessary to use the stoppers, and it is unnecessary to perform the rest swing operation. That is, the automated guided vehicle according to the invention is free from the difficulty that particle is produced during the rest swing operation. Therefore, the automated guided vehicle can be effectively used in a clean room.

What is claimed is:

1. An automated guided vehicle having a plurality of wheels movable in all directions, comprising:
    wheel drive means including a drive mechanism on each of said plurality of wheels for enabling the respective vehicle wheels to move said automated guided vehicle;
    a steering means for each wheel for controlling a direction of the respective wheel to control a direction of movement of the automated guided vehicle without changing a heading of the automated guided vehicle; and
    signal/power transmitting and receiving means for transmitting an electric power between an electric power source unit provided on a body of the automated guided vehicle and the respective wheel drive mechanisms and steering means and for transmitting control signals between a control unit provided on the body of the automated guided vehicle and the respective drive mechanisms and steering means, through a stationary electrode member provided on a member which is stationary with respect to the body of the automated guided vehicle and a rotary electrode member provided on a member which is rotatable with respect to the stationary electrode member, the stationary electrode member and the rotary electrode member being included into the signal/power transmitting and receiving means,
    wherein each said steering means includes means for rotating a respective said drive wheel and drive mechanism in one direction about an axis through an angle of 360° and said means for rotating the respective said drive wheel and drive mechanism includes a steering motor,
    wherein the steering means further includes:
        a steering shaft and a rotor on the steering shaft, the rotor being coupled with a respective drive mechanism, the rotor being positioned outside the steering shaft and movable in response to energization of a stator in response to said control signals to turn the drive mechanism and drive wheel around an axis of the steering shaft, and
        wherein the rotary electrode member is a slip ring provided on the steering shaft and the stationary electrode member is a brush mounted in elastic slide contact with the slip ring.

2. An automated guided vehicle as claimed in claim 1, wherein the steering means include:
    a motor disposed between the steering shaft and the rotor, the motor having a rotary shaft on which the slip ring is coaxially mounted,
    wherein the rotary shaft of the motor comprises said steering shaft, and
    wherein the steering shaft is hollow and cables of the electric power source unit and the control unit extend through the hollow steering shaft.

3. An automated guided vehicle as claimed in claim 1, wherein the slip ring is mounted on an outer periphery of the rotor, and the brush is mounted on a frame positioned outside the rotor.

4. An automated guided vehicle as claimed in claim 1, wherein the steering means is positioned parallel to the wheel drive means to drive the wheel drive means through a transmitting device.

5. An automated guided vehicle as claimed in claim 1, wherein the signal/power transmitting and receiving means includes a rotary transformer which performs a transmission of the control signals, and wherein the brush performs a transmission of the electric power.

6. An automated guided vehicle having a plurality of wheels movable in all directions, comprising:
    wheel drive means including a drive mechanism on each of said plurality of wheels for enabling the respective vehicle wheels to move said automated guided vehicle;
    a steering means for each wheel for controlling a direction of the respective wheel to control a direction of movement of the automated guided vehicle without changing a heading of the automated guided vehicle; and
    signal/power transmitting and receiving means for transmitting an electric power between an electric power source unit provided on a body of the automated guided vehicle and the respective wheel drive mechanisms and steering means and for transmitting control signals between a control unit provided on the body of the automated guided vehicle and the respective drive mechanisms and steering means, through a stationary electrode member provided on a member which is stationary with respect to the body of the automated guided vehicle and a rotary electrode member provided on a member which is rotatable with respect to the stationary electrode member, the stationary electrode member and the rotary electrode member being included into the signal/power transmitting and receiving means,
    wherein each said steering means includes means for rotating a respective said drive wheel and drive mechanism in one direction about an axis through an angle of 360°,
    wherein said means for rotating the respective said drive wheel and drive mechanism includes a steering motor,
    wherein the steering means further includes:
        a steering shaft and a rotor on the steering shaft, the rotor being coupled with a respective drive mechanism, the rotor being positioned outside the steering shaft and movable in response to energization of a stator in response to said control signals to turn the drive mechanism and drive wheel around an axis of the steering shaft, and wherein the stationary electrode member is a slip ring provided on the steering shaft and the rotary electrode member includes brushes mounted in elastic slide contact with the slip ring.

7. An automated guided vehicle as claimed in claim 6, wherein a motor is disposed between the steering shaft and the rotor, the motor having a rotary shaft on which the slip ring is coaxially mounted, wherein the rotor includes the rotary shaft of the motor, and wherein the rotor includes a hole for receiving cables of the electric power source unit and the control unit.

8. An automated guided vehicle as claimed in claim 5, wherein the signal/power transmitting and receiving means includes a rotary transformer which performs a transmission of the control signals, and wherein the brush performs a transmission of the electric power.

* * * * *